Aug. 26, 1969   T. W. STONE   3,463,949
END FRAME ATTACHMENT FOR DYNAMOELECTRIC MACHINE
Filed June 11, 1968
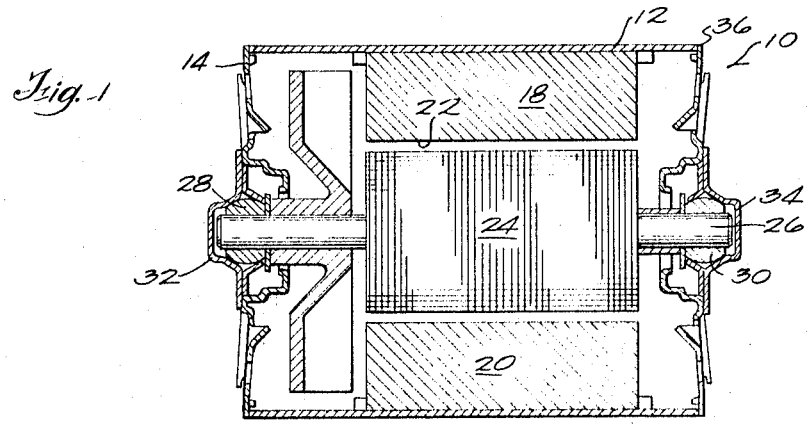
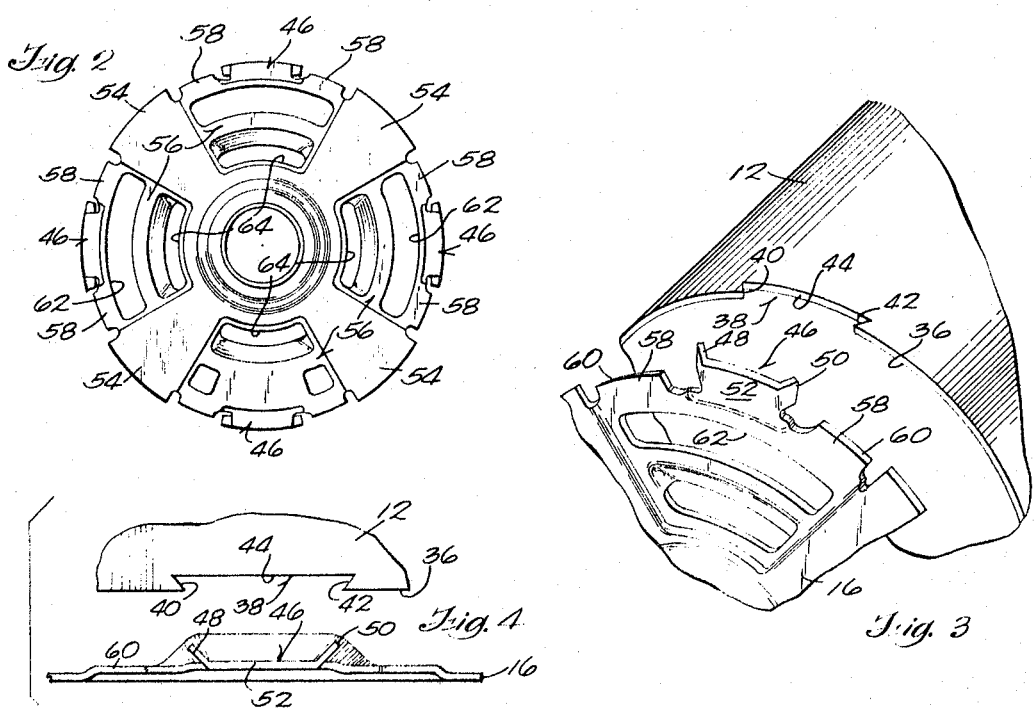
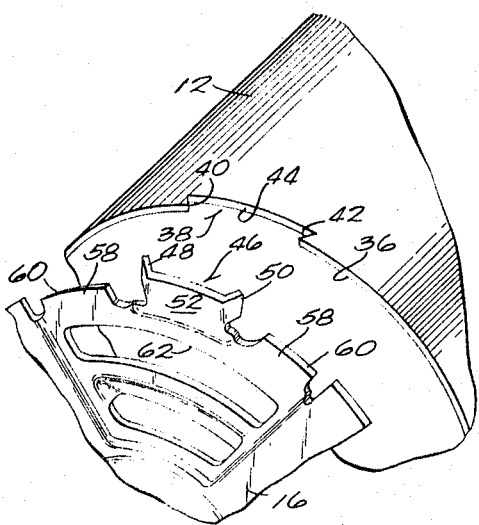
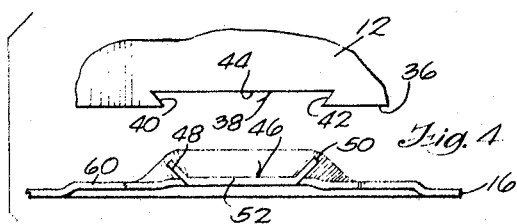
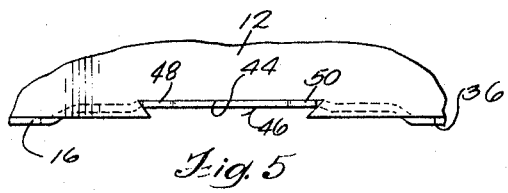
Inventor
Thomas W. Stone
By Joseph A. Lemignani
Attorney

United States Patent Office 3,463,949
Patented Aug. 26, 1969

3,463,949
END FRAME ATTACHMENT FOR DYNAMO-
ELECTRIC MACHINE
Thomas W. Stone, Owosso, Mich., assignor to Controls Company of America, Melrose Park, Ill., a corporation of Delaware
Filed June 11, 1968, Ser. No. 736,202
Int. Cl. H02k 15/14
U.S. Cl. 310—42
10 Claims

ABSTRACT OF THE DISCLOSURE

An end frame is held in place on a motor shell by bent end frame wedge tabs being inserted into dovetail notches in the end edge of the shell and then straightened in the notches to provide a wedge connection. The end frame also includes radially extending tabs which engage the end edge of the shell to cooperate in locating the end frame and holding it against axial movement. The end frame also includes trimmed register surfaces engaging the inner surface of the shell to provide air gap orientation between the end frame and the motor frame of which the shell is a part.

BACKGROUND OF INVENTION

Field of invention

This invention relates to dynamoelectric machinery and, more particularly, to the connection of an end frame in such machinery.

Description of prior art

It has been proposed to attach end frames to the frame or outer shell of an electric motor, or dynamoelectric machinery in general, through the use of casebolts, clamps, spring clips, welding and the like. These arrangements have not been entirely satisfactory because, for example, they require additional parts and some require special equipment to make the attachment.

SUMMARY OF INVENTION

A general object of this invention is to provide an improved attachment of an end frame to an outer housing shell or, more generally, the frame of a dynamoelectric machine and an attachment which requires neither additional parts nor special assembly equipment. For the achievement of this and other objects, this invention proposes a motor frame having an axially extending end portion. A number of notches are provided in the end edge of that end portion of the motor frame with the notches being relatively spaced around the end edge. Each notch includes first and second relatively spaced sidewalls which diverge axially inwardly from the end edge. An end frame is provided with wedge tabs which are located in the notches and engage the first and second notch sidewalls at points spaced inwardly from the open end of the notch. The wedge tabs are initially bent so that they can be inserted in the notches. When in the notches, the wedge tabs are straightened and wedged into engagement with the notch sidewalls. With the tabs wedged in the notches the end frame is securely held against movement relative to the motor frame.

In accordance with a more specific aspect of this invention the end frame is provided with additional tab portions which extend in a generally radial direction and engage the end edge of the motor frame end portion to cooperate in holding the end frame against axial movement relative to the motor frame. In addition, the end frame can be provided with trimmed registered surfaces which are adapted to engage the inner surface of the motor shell to orient the end frame relative to the motor frame to provide the desired air gap spacing and concentric relationship between the stator bore and the rotor.

DESCRIPTION OF DRAWINGS

FIG. 1 is an axial section of an electric motor embodying this invention;
FIG. 2 is an end view of the motor of FIG. 1;
FIG. 3 is an enlarged perspective of a portion of the motor shell illustrating the notch and wedge tab configuration;
FIG. 4 is a top view of a portion of the end frame and shell prior to assembly; and
FIG. 5 is a top view of the end frame and shell after assembly.

DESCRIPTION OF PREFERRED EMBODIMENT

As illustrated, electric motor 10 includes an outer housing shell 12, which is part of the motor frame, and end plates 14 and 16 closing the opposite axial ends of the shell. As illustrated, the motor frame also includes permanent magnets 18 and 20 attached to the inner surface of shell 12. Permanent magnets 18 and 20 define a stator bore 22 in which rotor 24 is supported for rotation. Rotor 24 includes shaft 26 which is journaled in bearings 28 and 30 suitably connected between bearing caps 32 and 34 and end plates 14 and 16. The connection of the bearing in the end plate assembly and the method of assembly can be as described and claimed in the co-pending application of Jerome Phillips, Ser. No. 690,865, filed Dec. 15, 1967, entitled Bearing Arrangement for Dynamoelectric Machine and Method of Assembling Same and assigned to the assignee of this application. The method of assembly will not be described in detail in this application and reliance is placed on the aforementioned co-pending application should a complete description be necessary. Although motor 10 is illustrated as including permanent magnets, it will be appreciated that a conventional laminated core and field windings could be used as well.

In the motor assembly it is necessary that the end plates be securely attached to the motor frame. This invention solves this problem of attachment by means of a relatively simple construction and one which facilitates attachment of the end plate to the motor frame. The construction of both end plates and their connection to the motor frame is identical, therefore only one end plate 16 and its connection to the frame will be described. At one of the axial ends of the motor, outer housing shell 12 includes a tubular extension terminating in an end edge 36 in which a number of notches 38 are suitably formed. Each notch includes opposed sidewalls 40 and 42 which diverge inwardly of the end edge and terminate in a common inner end wall 44. The diverging sidewalls and inner end wall attribute a dovetail type shape to each of the notches. To cooperate with the dovetail notches, end frame 16 is provided with wedge tabs 46 which are equal in number to the dovetail notches and have a spacing on the end plate which corresponds to the relative spacing between the notches. Each of the wedge tabs are generally T-shaped. The opposite ends 48 and 50 of the wedge tab are bent from the plane of the main body or web 52 of the wedge tab as illustrated in FIGS. 3 and 4. The ends are bent to allow entrance of the wedge tab into notches 38. Once positioned within the notches a force is exerted on the relatively broad web portion 52 of the wedge tab in an axial direction which causes the bent ends 48, 50 to straighten and move outwardly into engagement with opposed side walls 40 and 42 of the notches. It will be noted that the wedge tab ends are bent to diverge from the web, this facilitates sraightening when the force is applied. Straightening wedges the end of the wedge tabs into engagement with the sidewalls of the notches and spaced inwardly from the notch opening, as shown in the drawing the tab is wedged into the inner corners of the notch. As can be seen in FIG. 5, after the ends 48 and 50 have been straightened, the angle between the ends is greater than the distance across the notch opening so that the wedge tabs are securely anchored in the notches. This procedure is repeated at each of the wedge tabs either simultaneously or in sequence, and the end plate is securely connected to the motor shell.

The wedge tabs and notches hold the end frame against axial and rotational movement relative to the shell. Although the wedge tabs provide a secure attachment of the end plates to the motor shells, additional tabs 54 can be provided on the end plate. Four such tabs are provided and they are equi-angularly spaced about the end plate. Preferably, end plate 16, in the area 56 which carries the wedge tab, is recessed from the remainder of the end plate so that area 56 is offset axially inward from the portions which form tabs 54. When the wedge tabs are securely anchored in notches 38, the inner axially facing surfaces of tabs 54 engage the end edge of shell 12 to cooperate in holding the end plate against axial movement relative to the shell and the motor frame in general.

Also, trimmed register tabs 58 can be provided on the end plate. The register tabs are provided at recessed areas 56 and one on either side of each of the wedge tabs. The outer circumferential face 60 of each of the register tabs is accurately machined to be concentric with the axis of the end plate and for engagement with the inner surface of motor shell 12. As more completely described in the aforementioned co-pending application, the trimmed register surfaces function to locate the end plate relative to the motor frame to provide the requisite concentricity between the rotor, which is supported in bearings connected to the end plate, and bore 22. Also, as described in the above mentioned application the trimmed register surfaces can be used to locate the end plate in a fixture which fixture also accurately locates the motor bearing concentrically on the end plate with the end plate register surfaces providing the point of reference in the fixture and subsequently in the motor.

By positioning the trimmed register surfaces immediately adjacent wedge tabs 46 and with one such surface position on each side of each wedge tab, a secure anchoring of the end plate in the motor is obtained as well as an extremely accurate location of the end plate in the motor.

If desired, openings 62 and 64 can be provided in the end plates to provide for flow of air through the motor during operation.

As an alternative to insuring bearing concentricity through the use of the trimmed register surfaces, it is possible to utilize a shim arrangement. In this alternative embodiment shims would be inserted between the rotor and the permanent magnet until the end plate is firmly attached to the motor frame at which time the shims can be removed and the rotor will have the requisite concentricity in bore 22.

Although but one embodiment of the present invention has been illustrated and described, it will be apparent to those skilled in the art that various changes and modifications may be made therein without departing from the spirit of the invention or from the scope of the appended claims.

What is claimed is:
1. In a dynamoelectric machine
a motor frame having a generally annular axially extending end portion,
means defining a plurality of notches in the end edge of said motor frame end portion, said notches relatively spaced around said end edge and each including first and second spaced sidewalls diverging axially inward from said end edge,
and an end plate including first tab portions in said notches and engaging said first and second sidewalls spaced inwardly from the opening of said notch at said end edge so that said tab portions are wedged in said notches to hold said end frame on said motor frame.
2. The dynamoelectric machine of claim 1 wherein said end plate also includes second tab portions spaced from said first tab portions and extending in a generally radial direction,
and said second tab portions engaging the end edge of said motor frame end portion.
3. The dynamoelectric machine of claim 2 wherein said end plate also includes means defining a plurality of register surfaces facing radially outward and relatively spaced around said end frame, said register surfaces located adjacent to and one on each side of said first tab portions and engaging the inner surface of said axially extending end portion.
4. The dynamoelectric machine of claim 1 wherein said motor frame includes a generally cylindrical outer motor shell providing said motor frame end portion and said notches are provided in the end edge of said motor shell,
and wherein said end plate includes a plurality of arcuate register surfaces facing radially outward and relatively spaced around said end frame, said register surfaces being concentric with and engaging the inner surface of said shell.
5. The dynamoelectric machine of claim 4
including second tab portions spaced from said first tab portions and extending generally in a radial direction,
and wherein said second tab portions engage the end edge of said shell.
6. The dynamoelectric machine of claim 1
wherein said first tab portions are further characterized by a continuous extension between the portions thereof engaging said sidewalls to thereby provide an area for application of force to wedge said first tab portions into engagement with said sidewalls.
7. The dynamoelectric machine of claim 1
wherein said motor frame includes a generally cylindrical outer motor shell providing said motor frame end portion,
wherein said notches are angularly spaced around the end edge of said motor shell,
and wherein said first tab portions each include a web section extending radially on said end plate and end portions projecting from opposite sides thereof into engagement with said sidewalls.
8. The dynamoelectric machine of claim 7 wherein said end plate also includes second tab portions spaced from said first tab portions and extending generally in a radial direction,
and said second tab portions engaging the end edge of said motor frame end portion.
9. The dynamoelectric machine of claim 8 wherein said end plate also includes means defining a plurality of register surfaces facing radially outward and relatively spaced around said end plate, said register surfaces located adjacent to and one on each side of said first tab portions and engaging the inner surface of said axially extending end portion.

10. The method of attaching an end plate to a motor frame comprising the steps of providing a motor frame with a generally annular end edge and notches in said end edge including sidewalls diverging inwardly from said end edge, providing an end plate with tab portions spaced angularly on the end plate in accordance with the spacing of the notches on said end edge, said tab portions being bent so that the distance between the opposite sides of said tab portions is less the dimension of the notch opening, inserting said tab portions in said notches, and straightening said tab portions in said notches to engage the opposite sides of said tab portions with the sidewalls of said notches and thereby wedge said tab portions in said notches.

References Cited

UNITED STATES PATENTS

| | | | |
|---|---|---|---|
| 2,701,318 | 2/1955 | Feiertag | 310—258 |
| 2,944,169 | 7/1960 | Schmidt | 310—83 |
| 3,321,654 | 5/1967 | Allendorph | 310—258 |

WARREN E. RAY, Primary Examiner

U.S. Cl. X.R.

29—596; 310—89, 258